United States Patent
Murugesan

(10) Patent No.: US 11,068,996 B2
(45) Date of Patent: Jul. 20, 2021

(54) MANAGING INSURANCE PLATFORMS ON A DISTRIBUTED LEDGER

(71) Applicant: Hariprasath Murugesan, Austin, TX (US)

(72) Inventor: Hariprasath Murugesan, Austin, TX (US)

( * ) Notice: Subject to any disclaimer, the term of this patent is extended or adjusted under 35 U.S.C. 154(b) by 11 days.

(21) Appl. No.: 16/538,575

(22) Filed: Aug. 12, 2019

(65) Prior Publication Data
US 2020/0051174 A1    Feb. 13, 2020

Related U.S. Application Data

(60) Provisional application No. 62/718,268, filed on Aug. 13, 2018.

(51) Int. Cl.
*G06Q 40/08*    (2012.01)
*G06Q 40/04*    (2012.01)
*G06Q 20/36*    (2012.01)

(52) U.S. Cl.
CPC ......... *G06Q 40/08* (2013.01); *G06Q 20/3678* (2013.01); *G06Q 40/04* (2013.01)

(58) Field of Classification Search
CPC ...... G06Q 40/08; G06Q 40/04; G06Q 20/102; G06Q 20/3678
USPC ............................................. 705/4
See application file for complete search history.

(56) References Cited

U.S. PATENT DOCUMENTS 10,460,393 B2 * 10/2019 Trohler .............. G06Q 10/0635
2017/0004581 A1 *  1/2017 Trohler .................. G06Q 10/10

* cited by examiner

*Primary Examiner* — Lindsay M Maguire

(57) ABSTRACT

A computer-implemented method is used for: exchanging a first portion of digital currency tokens with an investor for a first fiat currency; designating a second portion of the digital currency tokens as a reserve; determining that a funding period is over and a minimum funding requirement is met; determining a value of the digital currency tokens; receiving an insurance premium from an insurance policy holder; transferring a risk pool premium to an insurance policy risk pool; exchanging an amount of the risk pool premium for risk pool tokens; receiving an approved policy claim associated with an insurance policy; transferring a second amount of the risk pool premium to the insurance policy holder; exchange an amount of risk pool tokens for an amount of a third fiat currency of equal value.

10 Claims, 11 Drawing Sheets

MANAGING INSURANCE PLATFORMS ON A DISTRIBUTED LEDGER

RELATED APPLICATIONS

This application claims the benefit of U.S. Provisional Application for Patent No. 61/718,268 filed Aug. 13, 2018, entitled "Smart Insurance Ecosystem Using Distributed Ledger Technology," the contents of which are incorporated by reference herein in their entirety.

FIELD OF THE INVENTION

The following relates to insurance platforms, and more specifically to a method for managing an insurance platform on a distributed ledger.

BACKGROUND OF THE INVENTION

Insurance companies are businesses that provide coverage, in the form of compensation resulting from loss, damages, injury, treatment or hardship in exchange for premium payments. The companies calculate the risk of occurrence then determines the cost to replace (pay for) the loss determine the premium amount.

BRIEF DESCRIPTION OF THE DRAWINGS

Some of the embodiments will be described in detail, with reference to the following figures, wherein like designations denote like members, wherein.

DETAIL DESCRIPTIONS OF THE INVENTION

Figure 1A:
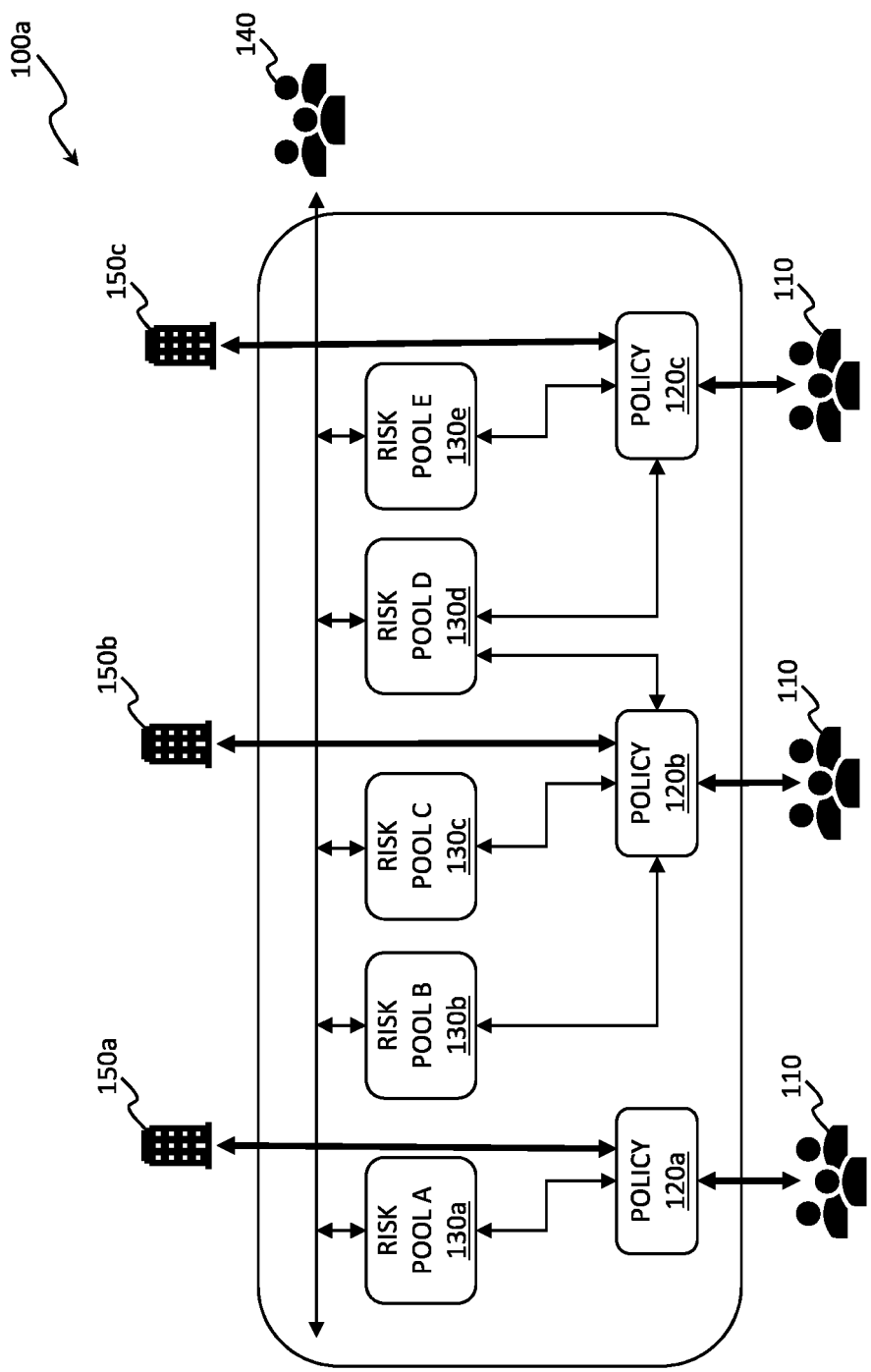
FIG. 1a depicts an exemplary insurance platform managed on a distributed ledger, in accordance with various embodiments.

Although certain embodiments are shown and described in detail, various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure. A more complete understanding of the present embodiments and advantages thereof may be acquired by referring to the following description taken in conjunction with the accompanying drawings, in which like reference numbers indicate like features.

As a preface to the detailed description, it should be noted that, as used in this specification and the appended claims, the singular forms "a", "an" and "the" include plural referents, unless the context clearly dictates otherwise.

Blockchain technology, for example, may be used to facilitate the control and/or management of data associated with a participant. A blockchain may be used as a public or private distributed ledger including an ordered and time-stamped record of transactions.

A distributed ledger (also called a "shared ledger," "distributed ledger technology," or "DLT") can be defined as a consensus of replicated, shared, and synchronized digital data geographically spread across multiple sites, countries, or institutions. There are no central administrators or centralized data storage in a distributed ledger. To implement a distributed ledger, a peer-to-peer network is typically required as well as one or more consensus algorithms to ensure ledger replication across nodes is undertaken.

As used herein, "smart contracts" are computer protocols that can operate on blockchains or distributed ledgers and perform predetermined transactions as well as digitally facilitate, verify, or enforce the negotiation or performance of contracts and/or contractual obligations. The examples described herein enable an insurance company to issue policies to one or more policy holders, and payout one or more claims using risk pools funded with, for example, a digital currency. As used herein, "exchanges" are financial transactions carried out between a buyer and a seller to exchange an asset for payment. As used herein, "currency" can include one or more fiat currencies, digital currencies (e.g., currencies only available in digital or electronic form, and not in physical form), cryptocurrencies (e.g., digital currencies in which one or more encryption techniques are used to regulate the generation of units of currency and verify the transfer of funds, operating independently of central banks), stable coins (e.g., digital currencies pegged to one or more fiat currencies, digital currencies, and/or exchange-traded commodities, such as precious metals or industrial metals). For example, precious metals can include, but are not limited to, gold, silver, platinum, palladium, rhodium, silver, as well as other metals having a high economic value; and industrial metals can include, for example, aluminum, copper, lead, nickel, steel, tin, zinc, as well as other metals with industrial applications.

Aspects of the disclosure provide for a computing device that performs one or more operations described herein in an environment including a distributed system of a plurality of devices coupled to each other via a network (e.g., a local area network (LAN), a wide area network (WAN), the Internet). For example, a computing device may communicate with one or more other computing devices, including one or more client devices, to facilitate participation management. In some embodiments, the computing device analyzes data associated with a plurality of user devices to facilitate a transaction between a plurality of users associated with the user devices.

The systems and processes described herein may be implemented using computer programming or engineering techniques including computer software, firmware, hardware or a combination or subset thereof. Aspects of the disclosure improve processor security, data integrity, data storage security, data security in networked devices, data transmission security, and/or communication between computing systems by controlling communications and managing access to various accounts using a public key cryptographic system and/or by verifying and validating transaction data using a proof-of-work protocol and a consensus protocol. Additionally, some aspects may improve user experience, user efficiency, and/or user interaction performance by facilitating transactions in an effective and efficient manner. Moreover, some aspects may increase processor speed, improve operating system resource allocation, and/or reduce error rate by automating the processing of large volumes of data.

Embodiments of the instant application seek provide a computer-implemented method for managing an insurance platform on a distributed ledger, the computer-implemented method includes generating digital currency tokens. A first portion of the digital currency tokens can be exchanged with an investor for a first fiat currency. A second portion of the digital currency tokens can be designated as a reserve. In response to determining that a funding period has finished, and a minimum funding requirement has been met, a value of the digital currency tokens can be determined. An insurance premium can be received from an insurance policy holder. The insurance premium can include a second fiat currency. A risk pool premium can be transferred to an insurance policy risk pool. The risk pool premium can include a first amount of the insurance premium. The insurance policy risk pool can be associated with an insurance policy selected by the insurance policy holder.

An amount of the risk pool premium can be exchanged for risk pool tokens. Risk pool tokens can include an amount of the digital currency tokens of equal value to the amount of risk pool premium. In response to receiving an approved policy claim associated with the insurance policy, a second amount of the risk pool premium can be transferred to the insurance policy holder. The approved policy claim can include a claim value. The second amount of risk pool premium can include a value equal to the claim value. The insurance policy risk pool can exchange an amount of risk pool tokens for an amount of a third fiat currency of equal value. The amount of risk pool tokens can include a value equal to the claim value.

Insurance companies are typically businesses that provide coverage, in the form of compensation resulting from loss, damages, injury, treatment or hardship in exchange for premium payments. The risk of occurrence is usually calculated to determine the cost to replace (i.e. pay for) the loss to determine the premium amount.

Traditionally, insurance companies pool premium funds and payout claims from the pooled funds. As used herein, a "payout" is the money paid to insurance policyholders (hereinafter "policyholders") when claims are accepted. In the event of a disaster or catastrophe, a scenario may arise where insurance companies have to payout more claims than the total premium. Considering this vulnerability, insurance companies are usually backed by reinsurance (i.e. insurance for insurance companies or "stop-loss" insurance). Reinsurance companies pay for losses faced by insurance companies that have insufficient total premium to payout claims. In exchange, the reinsurer accepts a portion of the insurance premium received from the insurance companies.

Referring to the drawings, FIG. 1a depicts an exemplary insurance platform managed on a distributed ledger, generally 100a, in accordance with some embodiments. Insurance platform 100a can utilize a distributed ledger (e.g., a blockchain or other distributed ledger technology) to manage risk in insurance products. In certain embodiments, insurance platform 100a can include one or more policy holders 110 that each purchase a policy 120. Each policy 120 can be managed by one or more policy admins 150 (e.g., insurance companies). One or more investors 140 may invest in insurance platform 100, for example, with an intention of receiving a return on their investments. For example, investors 140 may be one or more of insurance companies, institutional investors, and retail investors. Prior to issuing insurance policies, insurance platform 100 atypically requires cash (e.g., liquid cash) sufficient to address insurance claims.

Figure 1B:
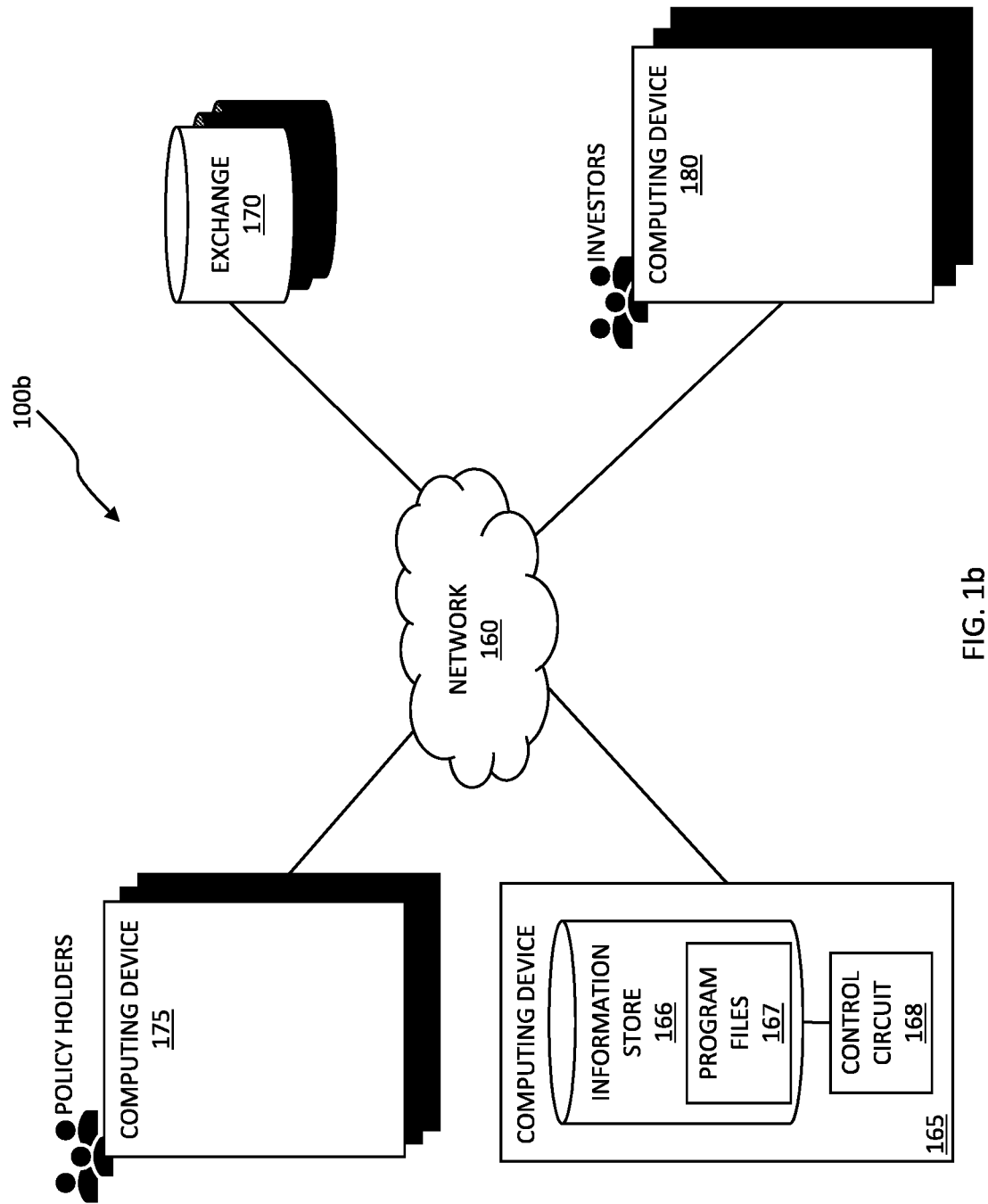
FIG. 1b is a block diagram illustrating an environment for managing an insurance platform on a distributed ledger, in accordance with some embodiments.

FIG. 1b is a block diagram illustrating an environment for managing an insurance platform in a distributed ledger, generally 100b, in accordance with some embodiments. Environment 100b can include computing devices 165, 175, and 180 as well as exchange 170, all in communication via network 160. In certain embodiments, one or more of computing devices 165, 175, and 180, exchange 170, and network 160 can be included in a distributed computing environment. In other embodiments, two or more of computing devices 165, 175, and 180, as well as exchange 170 can be included in the same computing device. In still other embodiments, one or more of computing devices 165, 175, and 180, as well as exchange 170 can be include two or more computing devices operating in a cluster computing framework. Network 160 can be, for example, a local area network (LAN), a wide area network (WAN), such as the Internet, a distributed computing environment, or a combination of the two, and can include wired, wireless, or fiber optic connections. Network 160 can be compatible with a variety of frequencies, such as those associated with Bluetooth, Wi-Fi, LTE, cellular, radio, microwave, as well as other wireless communication protocols. In general, network 160 can be any combination of connections and protocols that will support communications between computing devices 165, 175, and 180 as well exchange 170.

In some aspects, computing devices 175 and 180 are computing devices that can access insurance components of insurance platform 100a (e.g., computing device 165 and/or exchange 170). In some embodiments, computing devices 175 and 180 are associated with policyholders 110 and investors 140, respectively. In other aspects, computing device 165 is a computing device that can implement one or more of the methods, steps, and processes of platform 100a described herein. Computing device 165 can include program files 167 stored in information store 166, which can be executed utilizing control circuit 168. For example, program files 167 can include instructions reflecting one or more of the methods, steps, and processes of insurance platform 100a as conveyed herein. Exchange 170 can represent computer protocols that allow users to trade cryptocurrencies or digital currencies for other assets, such as fiat currencies and/or other digital currencies, in accordance with some embodiments. For example, exchange 170 can be one or more smart contracts processed by computing device 165 or one or more other computing devices.

Figure 1C:
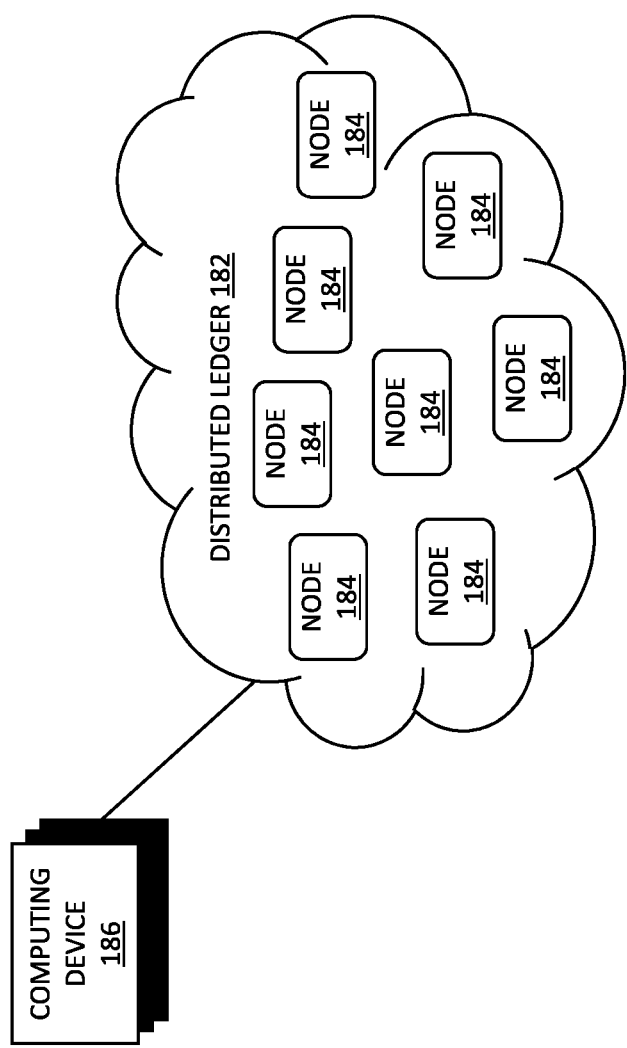
FIG. 1c depicts an embodiment of a distributed ledger, in accordance with certain embodiments.

FIG. 1c depicts an embodiment of a distributed ledger, in accordance with certain embodiments. Embodiments of ledger 182 may be a distributed peer-to-peer network, including a plurality of nodes 184. Ledger 182 may represent a computing environment for operating a decentralized framework that can maintain a distributed data structure. In other words, ledger 182 may be a secure distributed transaction ledger or a blockchain that may support document management. Each node 184 may maintain an individual public ledger (i.e. maintained publicly) according to set procedures that employ cryptographic methods and consensus algorithm(s) (e.g., a process used to achieve agreement on a single data value among distributed systems). In view of the public nature of the ledger and the proof-of-work concept, the nodes 184 collectively create a decentralized, trusted network. Further, embodiments of the publicly decentralized trusted ledger 182 may be accessible by computing device 186 for verifying a transaction, completing a transaction, or viewing transactions details. For example, distributed ledger 182 can include smart contracts that reflect at least one of the steps, methods, and processes conveyed herein. In some aspects, distributed ledger 182 can include one or more of computing device 165 and exchange 170.

Figure 2:
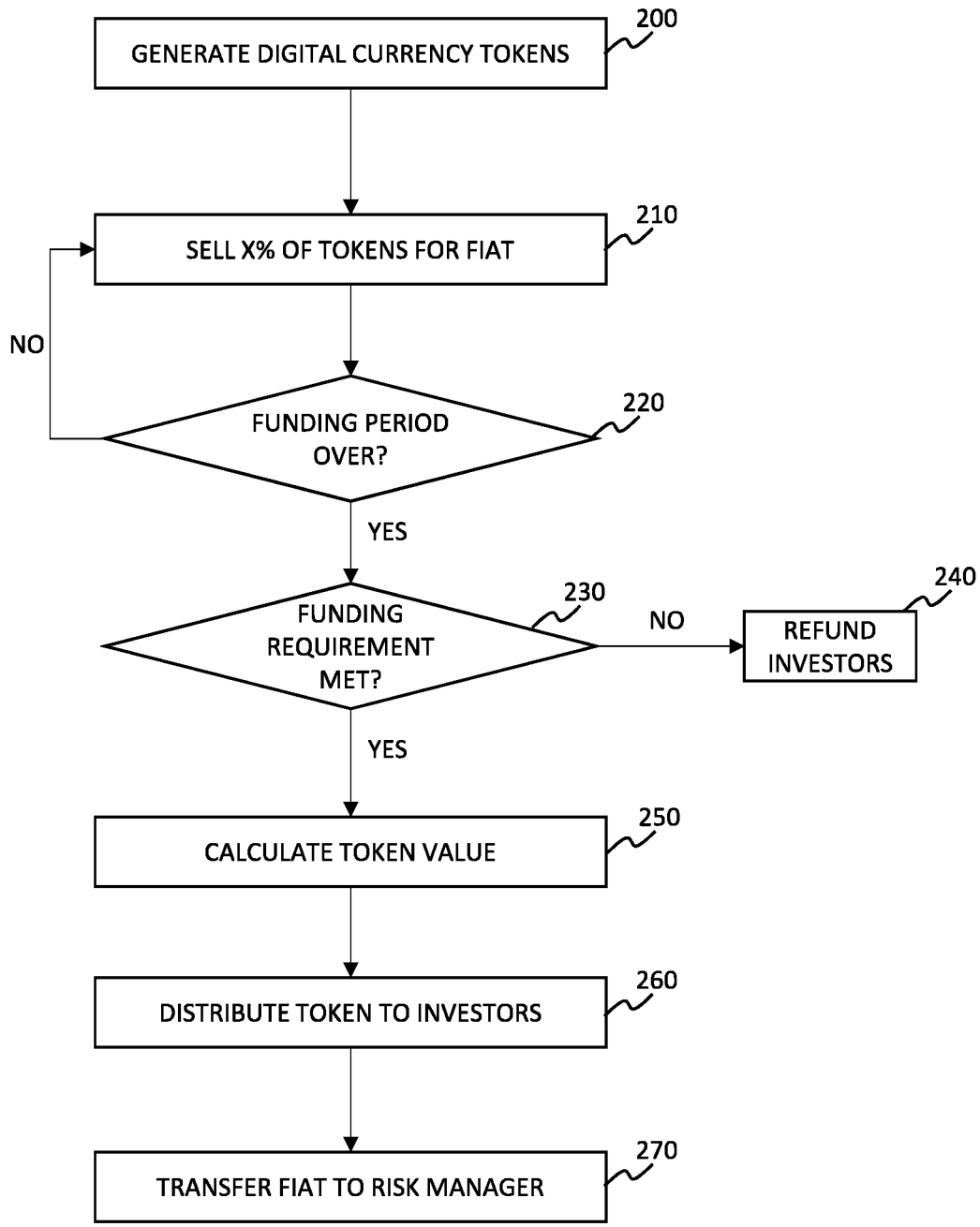
FIG. 2 depicts a method, in accordance with various embodiments.
Figure 3:
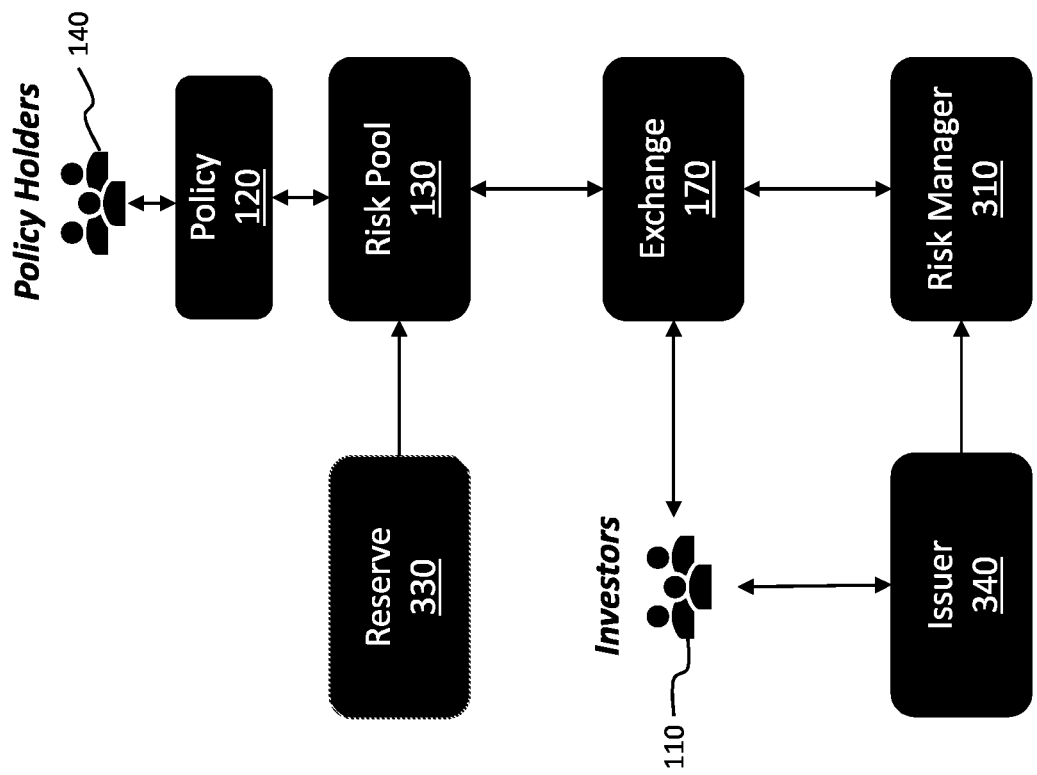
FIG. 3 depicts a block diagram illustrating functional relationships, in accordance with various embodiments.
Figure 4:
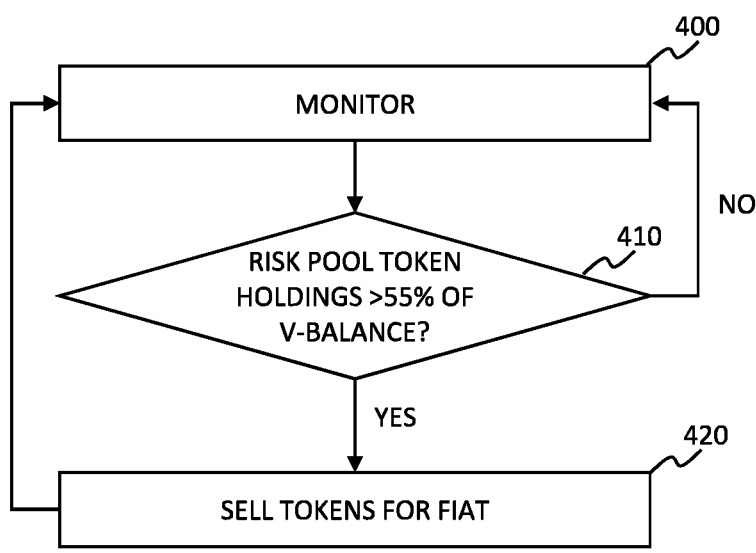
FIG. 4 depicts method, in accordance with various embodiments.
Figure 5:
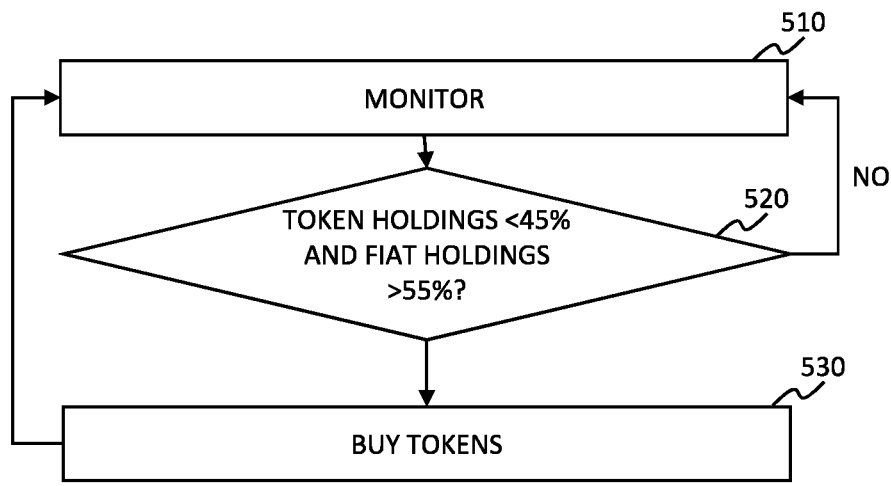
FIG. 5 depicts a method, in accordance with various embodiments.
Figure 6:
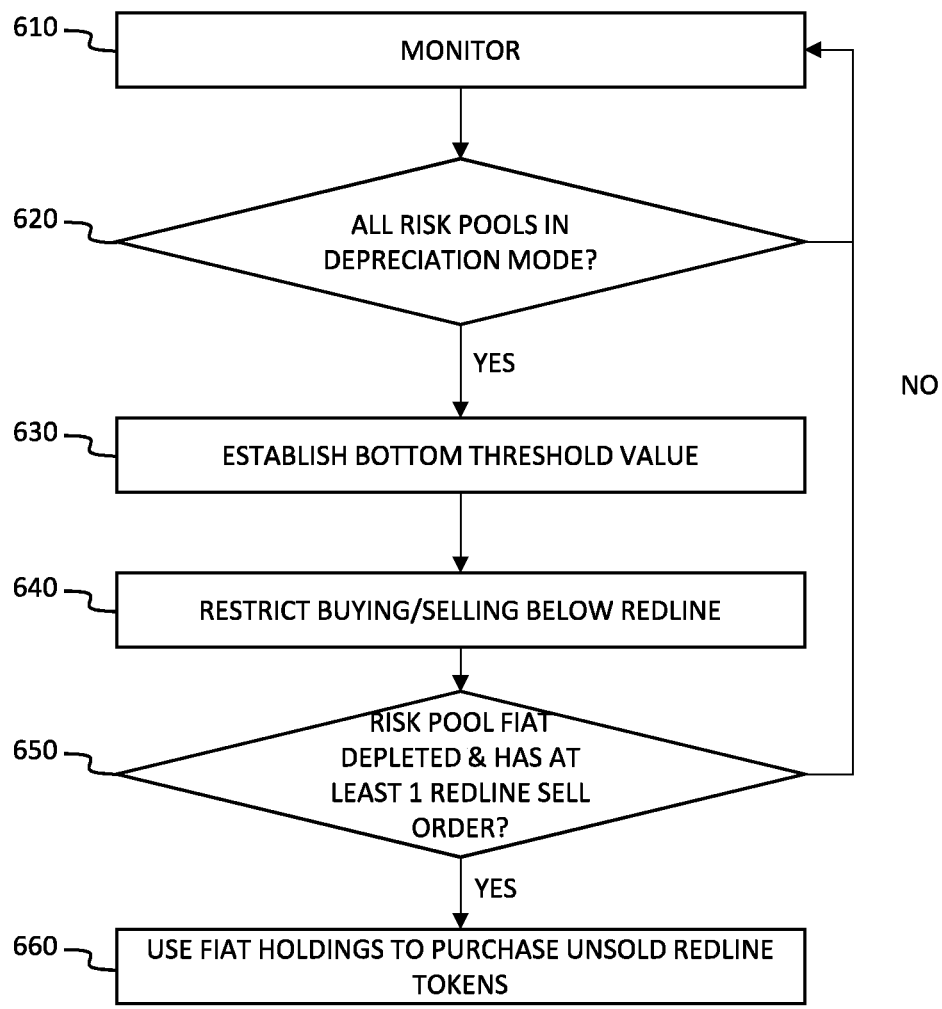
FIG. 6 depicts a method, in accordance with various embodiments.
Figure 7:
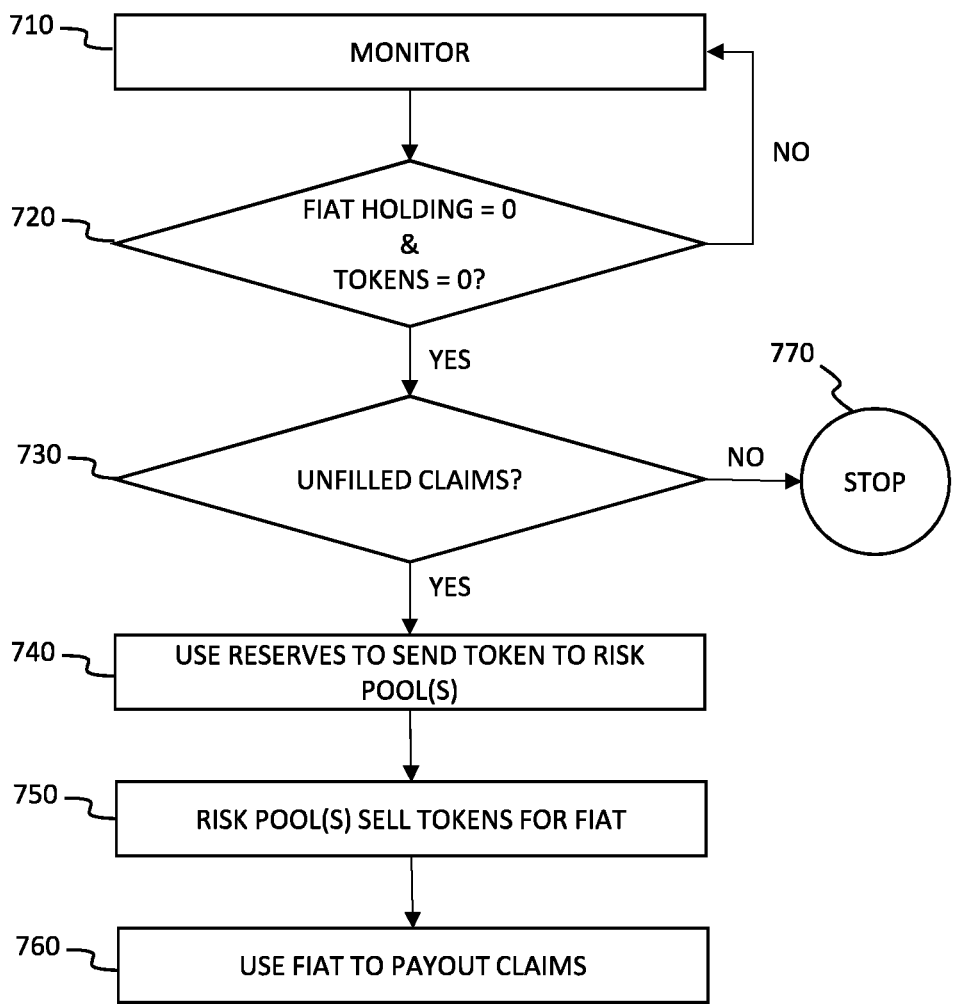
FIG. 7 depicts a method, in accordance with various embodiments.

FIG. 2 depicts a method, in accordance with some embodiments. FIG. 3 depicts a block diagram illustrating functional relationships of the components of platform 100, in accordance with some embodiments. In certain embodiments, insurance platform 100a generates the required funding by selling digital currency tokens (hereinafter "INS tokens"). For example, to maintain a fixed supply of INS tokens, the total number of INS tokens can be created (e.g., mined) once (step 200). For example, funds received resulting from INS token sales can be stored in an account linked to one or more smart contracts to be utilized by insurance platform 100a. In some aspects, one or more of the methods, steps, processes, and/or functions conveyed in the instant application can be executed as one or more smart contracts.

Typically, smart contracts are computer protocols that perform a specific set of actions. In a distributed ledger, such as distributed ledger 182, smart contracts each receive a unique address where transactions sent to that address undergo a specific set actions as defined by the smart contract. In this manner, smart contracts allow the performance of credible transactions without third parties. In other embodiments, minted INS tokens can be allocated to one or more reserve pools (hereinafter "Reserve" or reserve 330) and issuer pools (hereinafter "Issuer" or issuer 340). In certain aspects, a predetermined percentage of INS tokens from Issuer 340 can be made available for sale to one or more investors 110 (Step 210).

For example, suppose a total 17.1 billion INS tokens are minted where 15 billion and 2 billion INS tokens are allocated to Reserve 330 and Issuer 340, respectively. Typically, the INS token price is not fixed in the first coin offering. A portion of Issuer 340 INS tokens can be offered to institutional and/or retail investors (e.g., investors 110) in exchange for one or more types of fiat currencies at Step 210. However, these tokens may not be issued immediately after purchase. In some embodiments, INS tokens can be issued after a specific time frame called a "funding period." As used herein, funding period can define a predetermined time frame within which INS tokens are made available for sale to investors 110 and funds collected therefrom. The end of the funding period can be determined at Step 220 wherein INS tokens are sold until the end of the funding period. In some embodiments, based on the scale of risks in risk pools 130, a minimum funding requirement can be determined.

Risk (e.g., situations involving exposure to danger, harm, and/or loss) management can reflect one or more of the identification, evaluation, and prioritization of risks. For example, risk pools are a form of risk management that may be utilized in the insurance industry. Here, "risk pools" can refer to groups of resources (i.e., funds and/or other assets) received from various sources (i.e. investors) that can be utilized to address insurance claims. The term can refer to the pooling of similar risks that underlie the concept of insurance.

At the end of the funding period ("yes" branch Step 220), if the total fund amount collected is equal to or higher than the minimum funding requirement ("yes" branch Step 230), then the INS token value is calculated at Step 250. For example, INS token value can be calculated using Eq. 1:

$$INS \text{ token value} = F_t / INS_t \qquad [\text{Eq. 1}]$$

where $F_t$ is the total amount of collected funds and $INS_t$ is the total number of INS tokens sold to investors.

In other embodiments, if the minimum funding requirement is not met ("no" branch Step 230), then collected funds are returned to investors 110 at Step 240. Purchased INS tokens can be distributed to the investors 110 at Step 260. The collected funds are then forwarded to risk manager 310 at Step 270. For example, once issued, investors 110 may not be able to exchange (i.e. transfer, buy or sell) their INS tokens for a specified time period (e.g., a quiet period).

Continuing with the previous example, consider a set of risk pools (e.g., risk pools 130) that have a minimum funding requirement of $1 billion as a part of future risk assessment on severity and scale. $50 million of INS tokens are generated for subsequent sale offerings to potential investors (e.g., investors 110). A funding period of one month is set where the funds can be collected by issuer 340. At the end of the one-month funding period, the total collected amount is exactly $1 billion. Here, using Eq. 1, each issued INS token has a calculated value of $20. The $1 billion is transferred to risk manager 310 and Issuer 340 has 1.95 billion INS tokens remaining. Investors now have 50 million INS tokens, which are not currently transferrable.

In other embodiments, policy holders 110 can pay policy premiums using fiat currencies, which are typically inconvertible paper money made legal tender by a government decree. For example, when premium is associated with policies 120, a predetermined percentage thereof can be allocated to policy admins 150. The remaining amount of premium can be allocated to one or many risk pools 130 based on risks selected by policyholders 110. Once premium is allocated to risk pools 130, risk pools 130 can utilize, for example, 50% of its funds to purchase INS tokens, for example, from an exchange.

Referring to the example. At issuance, INS tokens issued to investors 140 are non-transferable, which reflects an exchange initially void of INS tokens. In some aspects, risk pools 130 can be restricted to exclusively purchasing INS tokens from exchange 170. For example, risk pool 130 can sell a predetermined quantity of INS tokens to exchange 170. In some aspects, funds (e.g., fiat currencies, cryptocurrencies, virtual currencies, and other forms of currencies) received by issuer 340 for INS token sales can be forwarded to risk manager 310.

In yet still other embodiments, investors 140 can transfer INS tokens based on the equation of EQ. 2:

$$INS_t = \text{\# of } INS \text{ tokens acquired in policy } 120 * X \qquad [\text{Eq. 2}]$$

where INS t represents the total number of transferable INS tokens, and X is a positive constant determined at the time of token issuance. For example, risk pools 130 typically purchase INS tokens if at least one policy 120 is deployed.

For example, let's consider that policy 120 possesses a single risk pool 130 and the total premium collected so far totals $11 million. Further, policy admin 150 receives $1 million from policy 120 for, for example, admin expenses; hence, risk pool 130 retains the remaining $10 million. Risk pool 130 may retain 50% of the $10 million (i.e. $5 million). Risk pool 130 can utilize the remaining $5 million to purchase INS token from exchange 170. For example, issuer 340 can sell $1 million of INS tokens on exchange 170 to create supply for this transaction prior to making policy 120 available for sale. As a result, risk pool 130 possess $5 million and 125,000 INS tokens.

In some aspects, when policy admin 150 approves an insurance claim, risk pool 130 can disperse a payout for the claim from, for example, its fiat balance. In other embodiments, payouts to policy holders 140 can be include fiat currencies, cryptocurrencies, virtual currencies, digital currencies, or a combination of two or more thereof. As a result of payouts, risk pool 130 may sell a number of INS tokens equal in value to the payout (e.g., to balance the fiat currency and INS token holdings and thereby enable risk pool 130 to payout claims without depleting its currency holdings.

Continuing with the above example, let's assume risk pool 120 approved a claim for $100,000 and paid out the claim using its USD holdings. As a result, risk pool's 130 USD holdings decrease from $5 million to $4.9 million and risk pool 130 subsequently sells $100,000 in INS tokens on exchange 170 to, for example, balance its fiat currency holdings.

Referring now to FIGS. 4-8, which each depict methods, in accordance with some embodiments. When INS token value increases, the total value of risk pool 130 may also increases as it contains the INS. For example, the virtual balance of risk pool 130 (hereinafter "vBalance"), herein defined as the difference between the amount of funds received and the amount of funds paid out Eq. 3:

$$vBalance = P_t - (C_t + \$_t) \quad [Eq. 3]$$

where $P_t$ is total premium, $C_t$ is total claim amount, and $\$_t$ is total cashback.

In certain embodiments, risk pool 130 can enter an "appreciation" mode when the value of its INS token holdings is greater than 55% (or another predetermined value) of its virtual balance (e.g., the value of risk pool 130 is higher than the collected premium). For example, if the value of INS token holdings of risk pool 130 increase to greater than 55% of its virtual balance ("yes" branch, step 410), then risk pool 130 sells (e.g., exchange INS tokens for one or more of a fiat currency and digital currency) some of its INS tokens on exchange 170 (step 420). As used herein, "appreciation mode" can refer to a situation where the value of risk pool 130 is higher than the premium collected. As an exemplary, if risk pool 130 received $110,000 in premium and paid out 10,000 in claims its vBalance reduces to $100,000 but the actual value is $120,000 ($50,000 in fiat and $70,000 in INS). The actual value of risk pool 130 can change based on INS valuation. Since the actual value of $120,000 is greater compared to its vBalance of $100,000, risk pool 130 is in appreciation mode.

As a response, risk pool 130 would sell some INS. Let's say it sells $8,000 in INS (not all at once, small values in many iterations) then the value in risk pool going to be ($58,000 in fiat and $62,000 in INS).

In other embodiments, if the value of risk pool's 130 INS holdings drops below 45% of its virtual balance and the value of its fiat holding exceeds 55% of the virtual balance (step 520), risk pool 130 can purchase INS tokens on exchange 170 (step 530). For example, risk pool 130 can have a vBalance of $100,000 and an actual balance that includes $58,000 in fiat and $62,000 in INS tokens. When the value of an INS token drops, it can affect the actual balance (e.g., $58,000 in fiat and $44,000 in INS). Here, risk pool 130 is still in appreciation mode, but the percentage of INS tokens of the actual balance is less than 45% and its fiat holdings are more than 55% of vBalance. In response, risk pool 130 may purchases additional INS tokens. In certain embodiments, the process of FIGS. 5 and 6 (discussed below) can promote stability in the INS token value and prevent the INS token value from decreasing beyond a predetermined threshold amount.

In yet still other embodiments, if the total value of the INS token holding of risk pool's 130 falls below 45% of its vBalance and the total value of its fiat holdings are less than 55% of the vBalance, then risk pool 130 can enter "depreciation" mode. In certain embodiments, if the actual balance of risk pool 130 is less than its vBalance, risk pool 130 can enter "depreciation mode." For example, when a particular risk pool 130 enters depreciation mode, other risk pools 130 that are in appreciation mode will initiate buy orders of INS tokens on exchange 170, for example, to frustrate further loss in the value of INS tokens.

If all risk pools 130 are in depreciation mode ("yes" branch, Step 620), an INS token bottom threshold value (i.e. "redline" value) can be established on exchange 170 (Step 630). Buy and sell transactions below the redline threshold are typically prohibited (Step 640). If the fiat holdings of risk pool 130 are depleted and there are at least one associated unfilled INS token sell order on exchange 170 at or below the redline threshold value ("yes" branch, Step 650), risk manager 310 can utilize its fiat holdings to fill unfilled INS token sell orders (Step 660). For example, here, exchange 170 can prioritize risk pool orders over investor's orders.

In yet still other embodiments, if risk pool 130 no longer possesses any fiat currency nor INS token ("yes" branch, Step 720), and there are unfulfilled associated insurance claims ("yes" branch, Step 730), reserve 330 can lend/transfer a certain amount of its INS tokens to risk pool 130 (Step 740). Risk pool 130 can sell the received INS tokens on exchange 170 for, for example, fiat currency (Step 750) and payout outstanding claims using the received fiat currency (Step 760).

Figure 9:
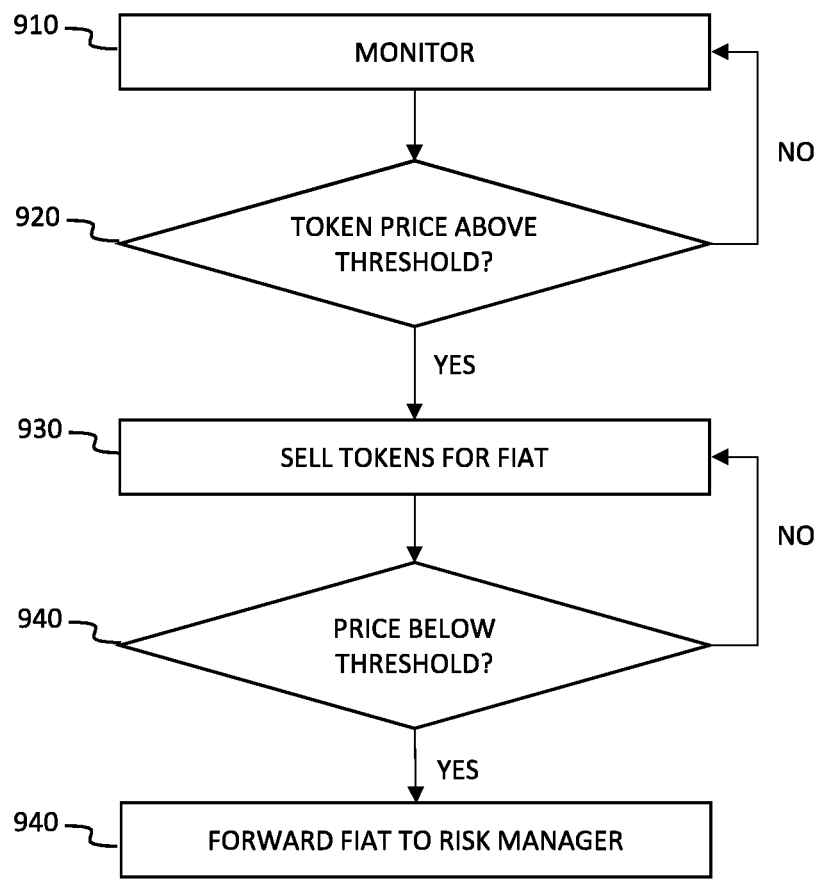
FIG. 9 depicts a method in accordance with various embodiments.

In some aspects, when the INS token price increases above a predetermined threshold value ("yes" branch, Step 920), issuer 340 can sell a predetermined amount of its INS tokens on exchange 170 (Step 930), for example, to minimize the price thereof. If the INS token price is determined to be below the predetermined threshold value ("yes" branch, Step 940), fiat currency received can be forwarded to risk manager 310 (Step 940). For example, the process of FIG. 9 can result in an increase in the fiat currency holdings of risk manager 310, which may promote the establishment of additional policies. In other embodiments, unused premium can be returned to the premium holder.

Not to be limited by theory, platform 100a can eliminate an insurance company's need for reinsurance protection to address overclaims, which can promote a reduction in premium costs. Here, the use of a public blockchain (i.e. a distributed ledger) can result in transparent transactions while shielding policy holder's 140 privacy information, which can be encrypted. Being a distributed ledger, platform 100a has no point of centralization, since the funds can be cryptographically protected in one or more smart contracts that are not under the control of any individual, corporation, or government.

In situations where insurance companies are exploiting overclaims by, for example, approving an excessive number of claims or collecting abnormally lower premium (e.g., compared to industry standards) from policy holders. Such behavior would typically lower INS token value and affect other insurance companies operating on platform 100a. To address such concerns, rules governing the development, application, participation, governance of platform 100a can be drafted by, for example, a council.

Figure 8:
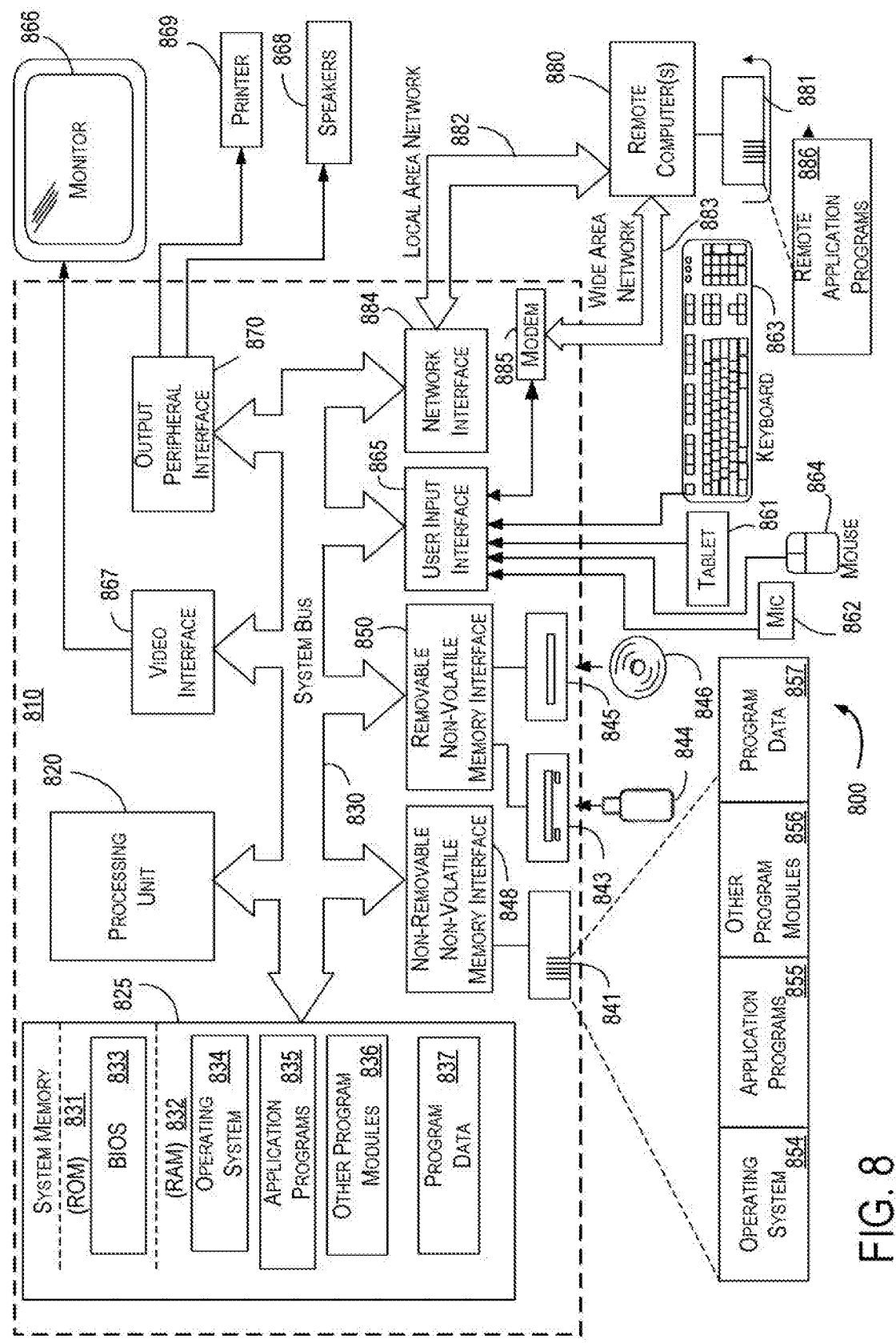
FIG. 8 depicts a block diagram illustrating an example operating environment for a computing device configured in accordance with various embodiments.

FIG. 8 is a block diagram illustrating an example operating environment 800 for a computing device (e.g., computing devices 165, 175, 180 as well as other computing devices executing one more steps, methods, processes of insurance platform 100a as conveyed herein). The computing system environment 800 is only one example of a suitable computing environment and is not intended to suggest any limitation as to the scope of use or functionality of the disclosure. Neither should the computing environment 800 be interpreted as having any dependency or requirement relating to any one or combination of components illustrated in the example operating environment 800.

The disclosure is operational with numerous other general purpose or special purpose computing system environments or configurations. Examples of well-known computing systems, environments, and/or configurations that may be suitable for use with the disclosure include, but are not limited to: personal computers, desktop computers, laptop computers, tablet devices, netbooks, handheld devices, mobile telephones, wearables, gaming devices, portable media players, server computers, kiosks, set top boxes, tabletop devices, multiprocessor systems, microprocessor-based systems, programmable consumer electronics, network PCs, minicomputers, mainframe computers, distributed computing environments that include any of the above systems or devices, and the like.

The disclosure may be described in the general context of computer-executable instructions, such as program modules, being executed by a computer. Generally, program modules include routines, programs, objects, components, data structures, and so forth, which perform particular tasks or implement particular abstract data types. The disclosure may also be practiced in distributed computing environments where tasks are performed by remote processing devices that are linked through a communications network. In a distributed computing environment, program modules may be located in local and/or remote computer storage media including memory storage devices and/or computer storage devices. As used herein, computer storage devices refer to hardware devices.

With reference to FIG. 8, an example system for implementing various aspects of the disclosure may include a general-purpose computing device in the form of a computer 810. For example, computer 810 can represent at least one of computing devices 165, 175, 180, 185, as well as exchange 170. Components of the computer 810 may include, but are not limited to, a processing unit 820, a system memory 825, and a system bus 830 that couples various system components including the system memory to the processing unit 820. The system bus 830 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 810 typically includes a variety of computer-readable media. Computer-readable media may be any available media that may be accessed by the computer 810 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or the like. Read only memory (ROM) 831 and random access memory (RAM) 832 are examples of computer storage media. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by the computer 810. Computer storage media does not, however, include propagated signals. Rather, computer storage media excludes propagated signals. Any such computer storage media may be part of computer 810.

Communication media typically embodies computer-readable instructions, data structures, program modules or the like in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The system memory 825 includes computer storage media in the form of volatile and/or nonvolatile memory such as ROM 831 and RAM 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs, such as application programs 835 (e.g., program files 167 and exchange 170), other program modules 836 and program data 837.

The computer 810 may also include other removable/non-removable, volatile/nonvolatile computer storage media. By way of example only, FIG. 8 illustrates a hard disk drive 841 that reads from or writes to non-removable, nonvolatile magnetic media, a universal serial bus (USB) port 843 that provides for reads from or writes to a removable, nonvolatile memory 844, and an optical disk drive 845 that reads from or writes to a removable, nonvolatile optical disk 846 such as a CD ROM or other optical media. Other removable/non-removable, volatile/nonvolatile computer storage media that may be used in the example operating environment include, but are not limited to, magnetic tape cassettes, flash memory cards, digital versatile disks, digital video tape, solid state RAM, solid state ROM, and the like. The hard disk drive 841 is typically connected to the system bus 830 through a non-removable memory interface such as interface 848, and USB port 843 and optical disk drive 845 are typically connected to the system bus 830 by a removable memory interface, such as interface 850.

The drives and their associated computer storage media, described above and illustrated in FIG. 8, provide storage of computer-readable instructions, data structures, program modules and other data for the computer 810. In FIG. 8, for example, hard disk drive 841 is illustrated as storing operating system 854, application programs 855 (e.g., a participation management environment), other program modules 856 and program data 857. Note that these components may either be the same as or different from operating system 834, application programs 835, other program modules 836, and program data 837. Operating system 854, application programs 855, other program modules 856, and program data 857 are given different numbers herein to illustrate that, at a minimum, they are different copies.

A user may enter commands and information into the computer 810 through input devices such as a tablet, or electronic digitizer, 861, a microphone 862, a keyboard 863 and pointing device 864, commonly referred to as mouse, trackball or touch pad. Other input devices not shown in FIG. 8 may include a joystick, game pad, digital camera, scanner, or the like. These and other input devices are often connected to the processing unit 820 through a user input interface 865 that is coupled to the system bus, but may be connected by other interface and bus structures, such as a parallel port, game port or a universal serial bus (USB). A monitor 866 or other type of display device is also connected to the system bus 830 via an interface, such as a video interface 867. The monitor 866 may also be integrated with a touchscreen panel or the like. Note that the monitor and/or touchscreen panel may be physically coupled to a housing in which the computing device 810 is incorporated, such as in a tablet device. In addition, computers such as the computing device 810 may also include other peripheral output devices such as speakers 868 and printer 869, which may be connected through an output peripheral interface 870 or the like.

The computer 810 may operate in a networked environment using logical connections to one or more remote computers, such as a remote computer 880. The remote computer 880 may be a personal computer, a server, a router, a network PC, a peer device or other common network node, and typically includes many or all of the elements described above relative to the computer 810, although only a memory storage device 881 has been illustrated in FIG. 8. The logical connections depicted in FIG. 8 include one or more local area networks (LAN) 882 and one or more wide area networks (WAN) 883, but may also include other networks. Such networking environments are commonplace in offices, enterprise-wide computer networks, intranets and the Internet.

When used in a LAN networking environment, the computer 810 is connected to the LAN 882 through a network interface controller or adapter 884. When used in a WAN networking environment, the computer 810 typically includes a modem 885 or other means for establishing communications over the WAN 883, such as the Internet. The modem 885, which may be internal or external, may be connected to the system bus 830 via the user input interface 860 or other appropriate mechanism. A wireless networking component such as comprising an interface and antenna may be coupled through a suitable device such as an access point or peer computer to a WAN or LAN. In a networked environment, program modules depicted relative to the computer 810, or portions thereof, may be stored in the remote memory storage device. By way of example, and not limitation, FIG. 8 illustrates remote application programs 885 as residing on memory device 881. It may be appreciated that the network connections shown are exemplary and other means of establishing a communication link between the computers may be used.

Embodiments of the instant application seek provide a computer-implemented method for managing an insurance platform, the computer-implemented method includes generating digital currency tokens. A first portion of the digital currency tokens can be exchanged with an investor for a first fiat currency. A second portion of the digital currency tokens can be designated as a reserve. In response to determining that a funding period is over, and a minimum funding requirement is met, a value of the digital currency tokens can be determined. An insurance premium can be received from an insurance policy holder. A risk pool premium can be transferred to an insurance policy risk pool. The risk pool premium can include a first amount of the insurance premium. The insurance policy risk pool can be associated with an insurance policy selected by the insurance policy holder.

The insurance premium can include a second fiat currency. A risk pool premium can be transferred to an insurance policy risk pool. The risk pool premium can include a first amount of the insurance premium. The insurance policy risk pool can be associated with an insurance policy selected by the insurance policy holder. The insurance premium can include a second fiat currency. An amount of the risk pool premium can be exchanged for an amount of risk pool tokens of equal value. Risk pool tokens can include an amount of the digital currency tokens of equal value to the amount of risk pool premium. In response to receiving an approved policy claim associated with the insurance policy, a second amount of the risk pool premium can be transferred to the insurance policy holder. The approved policy claim can include a claim value. The second amount of risk pool premium can include a value equal to the claim value. The insurance policy risk pool can exchange an amount of risk pool tokens for an amount of a third fiat currency of equal value. The amount of risk pool tokens can include a value equal to the claim value.

Although the invention has been explained in relation to its preferred embodiment, it is to be understood that many other possible modifications and variations can be made without departing from the spirit and scope of the invention.

What is claimed is:

1. A computer-implemented method for managing an insurance platform, the computer-implemented method comprising:

generating digital currency tokens;

exchanging a first portion of the digital currency tokens with an investor for a first fiat currency;

designating a second portion of the digital currency tokens as a reserve;

determining that a funding period is over and a minimum funding requirement is met;

in response to determining that the funding period is over and the minimum funding requirement is met, determining a value of the digital currency tokens;

receiving an insurance premium from an insurance policy holder, the insurance premium comprising a second currency;

transferring a risk pool premium to an insurance policy risk pool, the risk pool premium comprising an amount of the insurance premium, the insurance policy risk pool associated with an insurance policy selected by the insurance policy holder;

exchanging an amount of the risk pool premium for risk pool tokens, the risk pool tokens comprising an amount of the digital currency tokens of equal value to the amount of risk pool premium;

receiving an approved policy claim associated with the insurance policy;

in response to receiving the approved policy claim associated with the insurance policy, transferring a second amount of the risk pool premium to the insurance policy holder, the approved policy claim comprising a claim value, the second amount of risk pool premium comprising a value equal to the claim value;

exchange an amount of risk pool tokens for an amount of a third fiat currency of equal value, the amount of risk pool tokens comprising a value equal to the claim value;

wherein the computer-implemented method is implemented on a distributed ledger;

determining that the risk pool premium comprises a value of zero and the insurance policy does not comprise the risk pool tokens;

in response to determining that the risk pool premium comprises the value of zero and the insurance policy does not comprise the risk pool tokens, transferring a third amount of premium to the insurance policy risk pool, the third amount of premium comprising an amount of the reserves;

causing the insurance policy risk pool to exchange the third amount of premium for an amount of a fourth fiat currency of equal value;

identifying an unfilled approved policy claim comprising a second claim value and associated with the insurance policy; and in response to identifying the unfilled approved policy claim comprising the second claim value and associated with the insurance policy, causing the insurance policy risk pool to transfer an amount of the fourth fiat currency to the policy holder, the amount of the fourth fiat currency of equal value to the second claim value.

2. The computer-implemented method of claim 1, wherein exchanging a first portion of the digital currency tokens with an investor for an amount of a first fiat currency comprises exchanging the first portion of the digital currency tokens with the investor for an amount of a second digital currency token.

3. The computer-implemented method of claim 2, wherein exchanging the first portion of the digital currency tokens with the investor for an amount of a second digital currency token comprises exchanging the first portion of the digital currency tokens with the investor for an amount of a second digital currency token in the form of a digital currency token pegged to one or more of a third digital currency, a second fiat currency, and an exchange-traded commodity.

4. The computer-implemented method of claim 1, wherein selling the portion of the plurality of digital currency tokens to the investor for the currency comprises selling the portion of the plurality of digital currency tokens to the investor for a fiat currency.

5. The computer-implemented method of claim 1, further comprising:
   determining a value of the insurance policy risk pool; and
   in response to determining that a value of the risk pool tokens is greater than 55% of the value of the insurance policy risk pool, exchanging a second amount of the risk pool tokens for an amount of a fourth fiat currency.

6. The computer-implemented method of claim 1, further comprising:
   determining a value of the insurance policy risk pool; and
   in response to determining that both a value of the risk pool tokens and a value of the risk pool premium is less than 55% of the value of the insurance policy risk pool, exchanging an amount of the risk pool premium for an amount of digital currency tokens of equal value.

7. The computer-implemented method of claim 1, further comprising:
   determining a value of the insurance policy risk pool;
   in response to determining that both a value of the risk pool tokens and a value of the risk pool premium is less than 55% of the value of the insurance policy risk pool, determining a bottom threshold value for each of the plurality of digital currency tokens; and
   restricting an exchange of any of the digital cryptocurrency tokens below the bottom threshold value.

8. The computer-implemented method of claim 7, further comprising:
   in response to determining that the insurance policy risk pool comprises neither the risk pool tokens nor the risk pool premium, transferring a portion of the reserve to the insurance policy risk pool;
   causing the insurance policy risk pool to exchange the transferred portion of the reserve for an amount of a fourth fiat currency of equal value; and
   causing the insurance policy risk pool to transfer an amount of the fourth fiat currency to the policy holder, the amount of the fourth fiat currency of equal value to a value of a second approved policy claim associated with the insurance policy.

9. The computer-implemented method of claim 1, wherein exchanging a first portion of the digital currency tokens with an investor for a first fiat currency comprises exchanging the first portion of the digital currency tokens with the investor via an initial coin offering.

10. The computer-implemented method of claim 1, wherein generating the digital currency tokens comprises generating second digital currency tokens pegged to one or more of a second digital currency token, a fourth fiat currency, and an exchange-traded commodity.

* * * * *